United States Patent
Odinak et al.

(10) Patent No.: US 10,521,996 B2
(45) Date of Patent: Dec. 31, 2019

(54) COMPUTER-IMPLEMENTED SYSTEM AND METHOD FOR PROXIMITY-BASED COMPUTER APPLICATION CONTROL

(71) Applicants: Gilad Odinak, Bellevue, WA (US); Adam Goldberg, Amsterdam (NL)

(72) Inventors: Gilad Odinak, Bellevue, WA (US); Adam Goldberg, Amsterdam (NL)

( * ) Notice: Subject to any disclaimer, the term of this patent is extended or adjusted under 35 U.S.C. 154(b) by 0 days.

(21) Appl. No.: 15/988,902

(22) Filed: May 24, 2018

(65) Prior Publication Data
US 2019/0005763 A1  Jan. 3, 2019

Related U.S. Application Data (60) Provisional application No. 62/511,266, filed on May 25, 2017.

(51) Int. Cl.
| | | |
|---|---|---|
| *B60Q 1/48* | (2006.01) | |
| *G08G 1/14* | (2006.01) | |
| *G07F 17/24* | (2006.01) | |
| *G07B 15/02* | (2011.01) | |
| *H04W 4/40* | (2018.01) | |
| *H04W 4/02* | (2018.01) | |

(52) U.S. Cl.
CPC .......... *G07F 17/246* (2013.01); *G07B 15/02* (2013.01); *H04W 4/02* (2013.01); *H04W 4/40* (2018.02)

(58) Field of Classification Search
CPC ......... G07F 17/246; H04W 4/40; H04W 4/02; H04W 4/80; H04W 4/029; H04W 4/48; G07B 15/02

USPC ...................................... 340/932.2
See application file for complete search history.

(56) References Cited

U.S. PATENT DOCUMENTS

| | | | |
|---|---|---|---|
| 9,460,623 B2* | 10/2016 | Baughman | G07B 15/02 |
| 2014/0232569 A1 | 8/2014 | Skinder | |
| 2014/0379441 A1* | 12/2014 | Avendano | G07F 17/24 |
| | | | 705/13 |
| 2015/0063646 A1* | 3/2015 | Wang | G06K 9/00812 |
| | | | 382/104 |
| 2016/0140774 A1* | 5/2016 | Weinberger | G07B 15/02 |
| | | | 705/13 |

FOREIGN PATENT DOCUMENTS

| | | |
|---|---|---|
| EP | 2312537 | 4/2011 |
| GB | 2540413 | 1/2017 |
| WO | 0011616 | 3/2000 |

* cited by examiner

*Primary Examiner* — Tanmay K Shah
(74) *Attorney, Agent, or Firm* — Krista A. Wittman

(57) ABSTRACT

A computer-implemented system and method for proximity-based computer application control is provided. A parking session of a vehicle is monitored via a first application and tracked by a second application. An initial communication connection status between the vehicle and a device associated with a user of the vehicle is obtained. At a later time, a further communication connection status is obtained. The further communication connection status is compared with the initial communication connection status. A determination is made that the parking session has terminated when a status of the further communication connection status differs from the initial communication connection status and is connected. A session termination instruction is transmitted from the first application to the second application to terminate the parking session.

20 Claims, 5 Drawing Sheets

Fig. 5.

COMPUTER-IMPLEMENTED SYSTEM AND METHOD FOR PROXIMITY-BASED COMPUTER APPLICATION CONTROL

CROSS-REFERENCE TO RELATED APPLICATION

This non-provisional patent application claims priority under 35 U.S.C. § 119(e) to U.S. Provisional Patent application, Ser. No. 62/511,266, filed May 25, 2017, the disclosure of which is incorporated by reference.

FIELD

The present invention relates in general to computer applications and, in particular, to a computer-implemented system and method for proximity-based computer application control.

BACKGROUND

Parking in a garage or along a street in a large city often requires payment, which is generally made via a meter using paper currency and coins, as well as credit or debit cards. With advances in technology, including wireless communication and location tracking, payment can also be made via a smart device, such as a mobile phone or tablet. For example, upon finding a vacant parking space, a driver parks his car and activates a computer application for entering a location of the parked car and a time at which parking is to begin. After returning to the parked car, the user again accesses the application to provide a time at which the parking ends. Based on the parking duration of the car, a charge is applied to an account for the driver.

However, drivers frequently forget to terminate parking via the computer application, which results in increased parking charges that can be difficult to reverse. Unfortunately, at this time, conventional computers, including servers, do not currently know how nor when to terminate a session monitored by an application, such as a parking application. Leaving such parking sessions running without termination leads to additional parking charge to the driver without actual usage of the parking space. The driver then often will want to request an adjustment of the parking charges, to remove the incorrect additional charge. A procedure to facilitate such requests via a computer, including a mechanism for the driver to prove that the car indeed only occupied the parking space for a shorter period, requires many additional computational resources. For example, when the complaint is facilitated via a web portal, additional servers and software will be required to receive and validate the driver's complaint, and initiate payment refund requiring memory and processing resources that would otherwise be unnecessary. Further, high numbers of drivers requesting such changes or refunds can fill a queue of communications from drivers increasing response times and preventing other drivers with other parking questions from obtaining assistance in a timely manner. Accordingly, reducing a number of such requests for refunds by terminating parking sessions can increase available computer memory, reduce a queue size, and decrease unnecessary computer processing, which can result in increasing a speed of the computer based on a lower number sessions maintained and people serviced.

Additionally, allowing parking sessions to continue after a driver has left the parking space requires computational resources during the extended parking session that would not be necessary if the session was terminated at a correct time. For instance, once parking is initiated via a parking application, a session is created for the driver and stored in a queue for monitoring until the parking is terminated. If the parking is not terminated when the driver leaves the parking space, the parking session remains in the queue and computational resources for monitoring the session are required. Additionally, leaving parking sessions pending when they could be terminated requires additional memory to store those sessions. Servers are limited in how many sessions can run at a single time and thus, preserving memory for all actual pending sessions is important, by removing sessions for which the driver has already left the parking space, but not terminated the parking session.

Accordingly, a system and method for conveniently monitoring and ensuring payment for parking is needed to prevent increased parking fees. Preferably, the system and method will automatically initiate and terminate parking and consider parking permits of the user, as well as third party authorizations to park to prevent double charging the user. The termination of such parking reduces computational resources, which are unnecessary, and further reduces memory required to store parking sessions that can be terminated.

SUMMARY

To increase parking convenience and prevent overcharging, an automated parking payment system and method are utilized. A location of a mobile device is determined by a first application and if the mobile device is determined to be in a vehicle located in a parking space, a reminder is provided to the driver to pay for parking. Upon removal of the device from the vehicle, the location of the device is monitored. When the device is determined to be located within the vehicle and the vehicle is moving, the parking is automatically terminated via a parking application.

A computer-implemented system and method for proximity-based computer application control is provided. A parking session of a vehicle is monitored via a first application and tracked by a second application. An initial communication connection status between the vehicle and a device associated with a user of the vehicle is obtained. At a later time, a further communication connection status is obtained. The further communication connection status is compared with the initial communication connection status. A determination is made that the parking session has terminated when a status of the further communication connection status differs from the initial communication connection status and is connected. A session termination instruction is transmitted from the first application to the second application to terminate the parking session.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Conventional applications for managing parking and payment often require a driver to initiate the parking by providing a start time for the parking upon arrival to a vacant parking space and subsequently, ending the parking duration by entering a time of departure from the parking space. However, drivers often forget to either initiate the parking or terminate parking, which can result in fines or excess charges, respectively. Accordingly, automatically terminating or paying necessary parking charges prevents such fines or charges.

Figure 1:
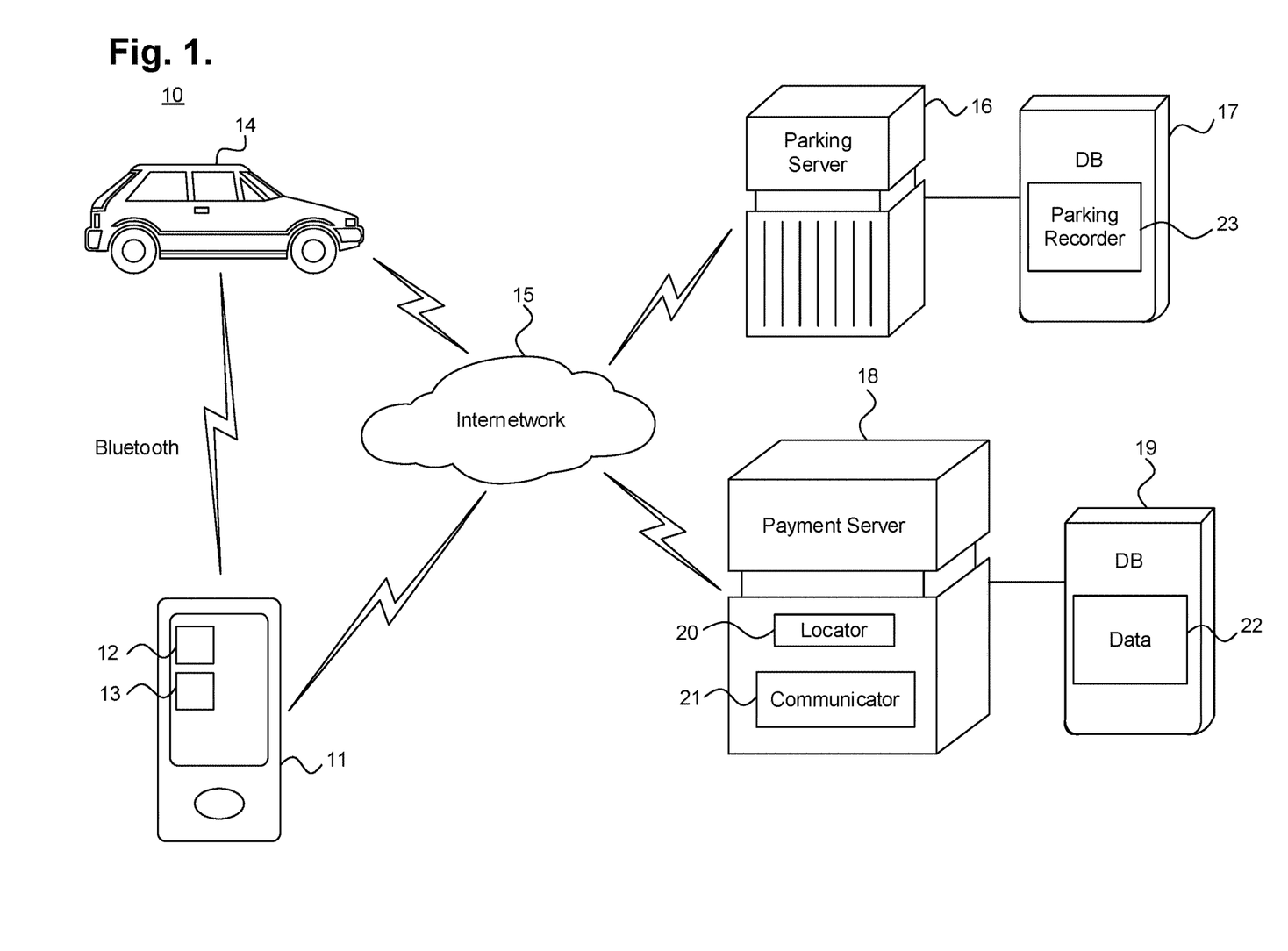
FIG. 1 is a functional block diagram showing a system for proximity-based computer application control, in accordance with one embodiment.

Automatically initiating and terminating parking helps prevent unnecessary charges and parking fines. FIG. 1 is a functional block diagram showing a system 10 for proximity-based computer application control, in accordance with one embodiment. A driver utilizes a personal device 11, such as a mobile phone, tablet or laptop computer, to access a management application 12 that monitors parking usage and payment by a parking application 13. The management application 12 interfaces with a payment server 18, which includes a locator 20 and a communicator 21, while the parking application 13 interfaces with a parking server 16. However, in a further embodiment, the functions or steps performed by the parking and management applications, as described below, can be merged into a single application. For example, the management application can be merged into an already existing parking application.

The management application 12 monitors the parking application 13 and determines whether the driver has initiated parking, made a payment via the parking application 13, or terminated parking. The parking server 16 is interconnected to a database 17 in which parking records are stored. If payment is made, the locator 20 of the payment server 18, requests a location of the personal device 11, such as using GPS in the personal device or located in a vehicle 14, which the driver is driving, and whether the personal device 11 is located within the vehicle 14. The management application 12 obtains the requested data, which is sent via an internetwork 15 to the payment server 18 and stored in a database 19 interconnected to the payment server 18.

Meanwhile, the management application 12 continues to monitor a location of the personal device 11 to determine whether the personal device is located within the vehicle. The locator 20 can request the location data for the personal device 11 at random times, on a periodic basis, or as scheduled. Upon identifying that the personal device is located within the vehicle and that the vehicle's location is different from the recorded location of the parking space, the management application activates the parking application to terminate parking. Specifically, the communicator 21 requests the management application 12 to communicate with the parking application 13 to provide a termination time for parking and make payment. In a further embodiment, the payment server 18 interfaced with the management application 12 communicates directly with the parking server 16 interfaced with the parking application to terminate parking and make payment or alternatively, the payment server 18 communicates with the parking application to terminate parking.

In yet a further embodiment, the management application 12 and the parking application 13 communicate locally on the personal device 11 without any requests or prompts from the parking server 16 and payment server 18. In a still further embodiment, the personal device is embedded in the vehicle and the management application determines that the vehicle is parked and the driver is not in the vehicle via sensors embedded in the vehicle, such as in the seat cushions, or via motion detectors to initiate parking. Subsequently, when the management application determines that the vehicle is moving, the application can terminate parking and make payment via the parking application.

In an alternate embodiment, when both the personal device and the vehicle are equipped with Bluetooth communications, the personal device can determine whether the device itself is located within the vehicle by monitoring the status of Bluetooth connection between the personal device and the vehicle. For example, when the management application is opened on the personal device for the first time, a list of all known Bluetooth devices is identified and provided to the driver. The driver selects the Bluetooth device that represents the vehicle and thereafter, every time the management application is started on the personal device, the application automatically tries to connect to the vehicle via Bluetooth. Further, while the management application is active, the Bluetooth connection is monitored. Once a connection is established, the personal device is determined to be in close proximity of or within the vehicle. Conversely, when no communication connection is made, the personal device is determined to be outside a proximal distance of the vehicle. Further, in lieu of Bluetooth, other communication connections can be utilized between the personal device and vehicle.

The mobile device 11 and servers 16, 18 can each include one or more modules for carrying out the embodiments disclosed below. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the computing devices and server can act as a specialized computer. For instance, when the modules are implemented as hardware, that particular hardware is specialized to perform message prioritization and other computers cannot be used. Additionally, when the modules are burned into read-only memory components, the computing device or server storing the read-only memory becomes specialized to perform the message prioritization that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
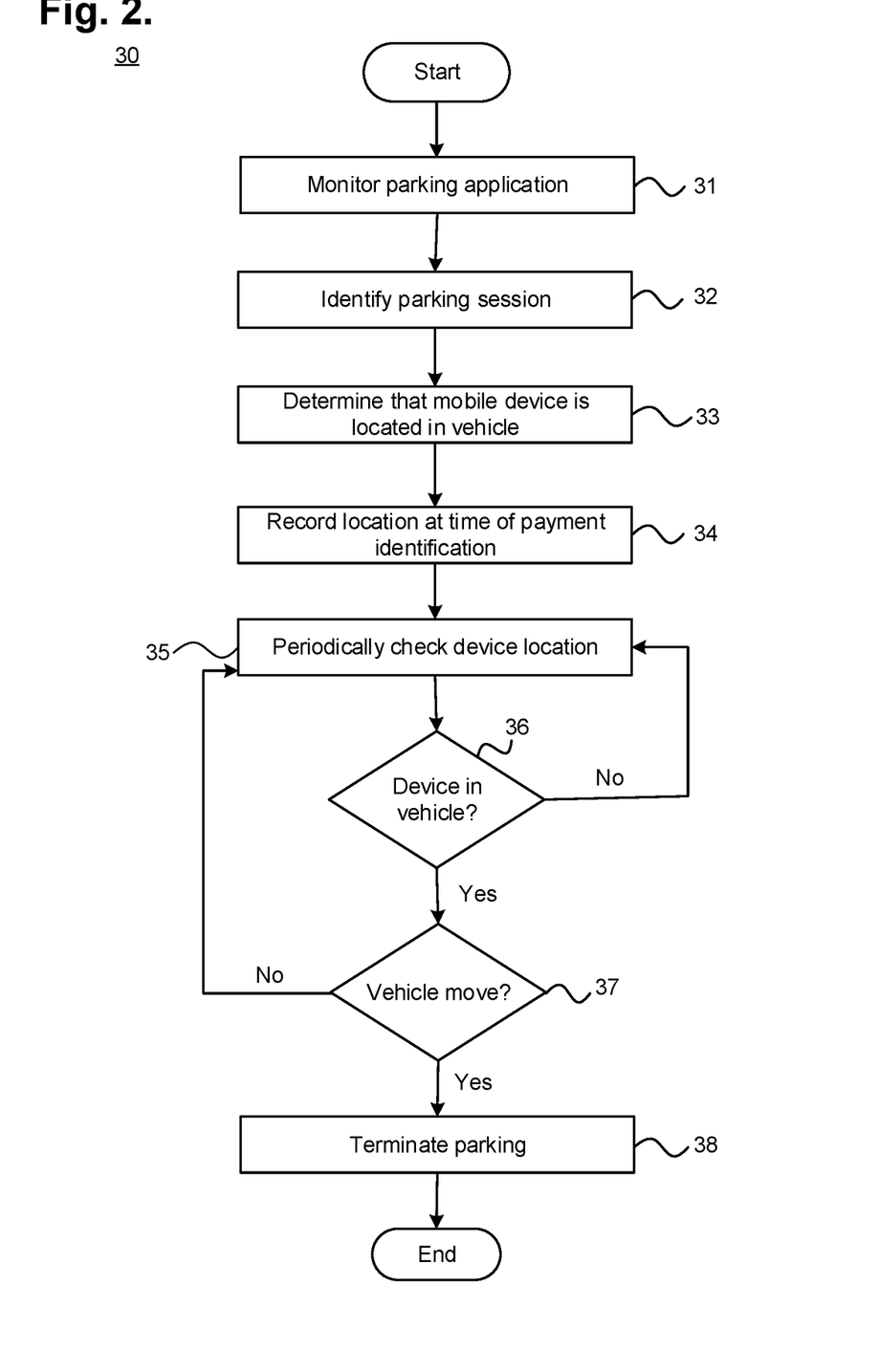
FIG. 2 is a flow diagram showing a method for proximity-based computer application control, in accordance with one embodiment.

Monitoring parking and making payment can be initiated upon parking in a vacant parking space upon a location of the vehicle or based on input of the driver. FIG. 2 is a flow diagram showing a method 30 for proximity-based computer application control, in accordance with one embodiment. A driver associated with a mobile device and a vehicle is looking for parking. A parking application with which a driver has an account is monitored (block 31). Monitoring of another application, such as the parking application, by the management application can occur when a user enters, for example, a user ID and password of the other application into the management application. Eventually, a valid parking session, which can be initiated by the driver, is identified (block 32) within the parking application. The parking session can be initiated once the driver has identified a vacant parking space and reserved the parking space, such as by providing a parking location to a parking application and a form of payment, which can be charged after the parking is terminated.

Upon identification of the parking session, a determination is made (block 33) as to whether the mobile device is located in the vehicle. The mobile device can be determined to be in the vehicle, for example, when the mobile device is paired with the vehicle via Bluetooth or other data communication connection. Subsequently, if the mobile device is determined to be located in the vehicle, a location of the mobile device is determined (block 34) and assigned to the vehicle. When the mobile device is located within the vehicle at a point where the parking session is initiated and payment for parking begins, the vehicle is determined to be located in a parking space.

Subsequently, the driver leaves the vehicle with or without the mobile device. Regardless, a location of the mobile device is determined (block 35) at different intervals, including at random times, periodically, or as scheduled. Based on the location of the device, a determination is made (block 36) as to whether the mobile device is located within the vehicle. For example, the location of the device is compared with the previously assigned location of the vehicle (block 34). Additionally, if located in the vehicle, the last determined location of the mobile device is assigned to the vehicle and a further determination is made (block 37) as to whether the vehicle has moved from the parking space. Movement of the vehicle can be determined by comparing the location identified in block 34 with the further location identified. If the locations are the same, the vehicle has not moved, and a location of the mobile device is continuously checked (block 35) until a determination is made that the vehicle has moved. However, if the locations are not the same, the vehicle has likely moved and parking is automatically terminated (block 38). In one embodiment, a threshold change in distance can be used to determine that the vehicle has moved. For example, the threshold can be set at 100 meters to ensure that the vehicle has truly left the parking space so that the space is available to others.

Specifically, the parking is automatically terminated within the parking application via the management application so that a user does not manually have to access the parking application to terminate parking. For example, upon identifying that the vehicle has moved, such as a threshold distance, the management application contacts the parking application, which monitors the parking duration and charges for parking based on duration, to terminate parking.

Figure 3:
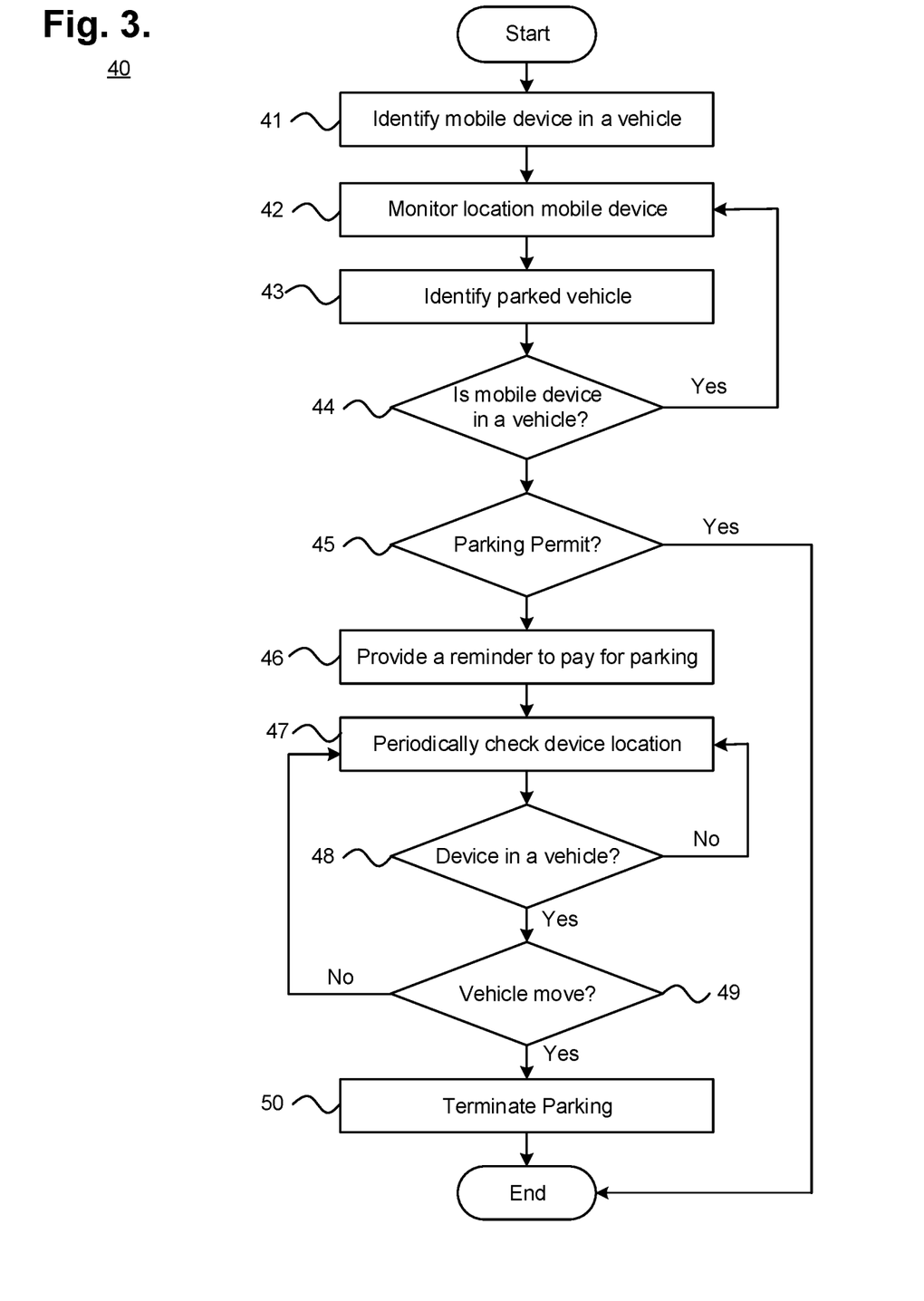
FIG. 3 is a flow diagram showing, by way of example, an alternative method for proximity-based computer application control.

Parking management can also provide the driver with a reminder to initiate a parking session to prevent fines or additional charges, in addition to terminating parking. FIG. 3 is a flow diagram showing, by way of example, an alternative method 40 for proximity-based computer application control. A mobile device is associated with a driver and a location of the device is monitored. At some point, a determination is made that the mobile device is located (block 41) within a vehicle of the driver. The device can be determined to be located in the vehicle based on an identified Bluetooth connection between the device and the vehicle or by comparing a location of a GPS device in the vehicle with the device location. However, other means for determining whether the device is located in the vehicle are possible.

When located in the vehicle, a location of the mobile device is continuously monitored (block 42). Meanwhile, the driver selects a parking space. The selected parking space can be identified by the management application, such as based on a location of the vehicle. The location of the vehicle can be determined based on the location of the mobile device inside the vehicle or using GPS provided in the vehicle. Upon determination, the location of the vehicle can be compared with a list of parking spaces and the parking space with the closest coordinates can be identified as the parking space selected by the driver. Other means for identifying the selected parking space are possible, such as by using RFID or other location identification technology.

Once parked, a determination is made (block 43) as to whether the mobile device is still in the vehicle. If still in the vehicle, the location of the mobile device continues to be monitored randomly, periodically, or as scheduled until and if the device is determined to leave the vehicle or the vehicle moves away from the parking space, as described below. However, if the mobile device is no longer in the vehicle, the driver is believed to be walking away from the vehicle in the parking space. After a predetermined amount of time has passed since the driver left the vehicle or after the driver has moved outside a predetermined distance from the vehicle, the management application determines that the driver has likely forgotten to initiate the parking application to start payment for parking. Thus, the management application determines whether the driver has a parking permit (block 44) for parking in the selected parking space. If yes, the management application notifies the parking application of the selected parking space for the driver and informs the parking application that no payment is necessary since the driver has a parking permit. In a further embodiment, the management application can block the parking application from initiating payment when the driver has a valid parking permit or alternatively, a reduced fee is due. However, if the driver does not have a parking permit, a reminder is provided (block 45) to the driver to initiate parking, such as by providing a location of the parking space along with payment information to prevent unauthorized parking, which may result in a parking ticket.

While the vehicle is parked and the driver is away, the location of the mobile device is tracked (block 46) at random times, periodically, or as scheduled. Based on the tracked locations, a determination is made (block 47) as to whether the device is returned to the vehicle. If returned, a further determination is made as to whether the vehicle has moved (block 48) from the parking space. As described above with reference to FIG. 2, a threshold distance can be used to determine whether the vehicle has left the parking space. Finally, if the vehicle has left the parking space, the parking reservation within the parking application is automatically terminated via the management application.

In one example, Kimberly and Justin are driving to Southcenter Mall to watch a movie. Justin parks the car in parking space number 4 upon arriving at the parking garage at Southcenter. Subsequently, Justin opens the parking application downloaded on his mobile phone and initiates a parking session and payment for parking by providing a location and space number. Concurrently, the management application, which is also downloaded on Justin's mobile phone, determines whether the mobile device is located in the vehicle and if so, a location of the vehicle is recorded. Justin and Kimberly leave the vehicle to watch the movie. During the movie, the management application monitors a location of the mobile phone to determine whether Justin and Kimberly have returned to the vehicle. Eventually, the management application determines that the mobile phone is located in the vehicle, which indicates that Justin and Kimberly have returned to the vehicle. The management application also monitors whether the vehicle has moved and if so, the management application determines that Justin forgot to terminate parking via the parking application. Accordingly, the management application contacts the parking application to terminate the parking session for Justin to prevent excess fees for time not actually parked.

Figure 4:
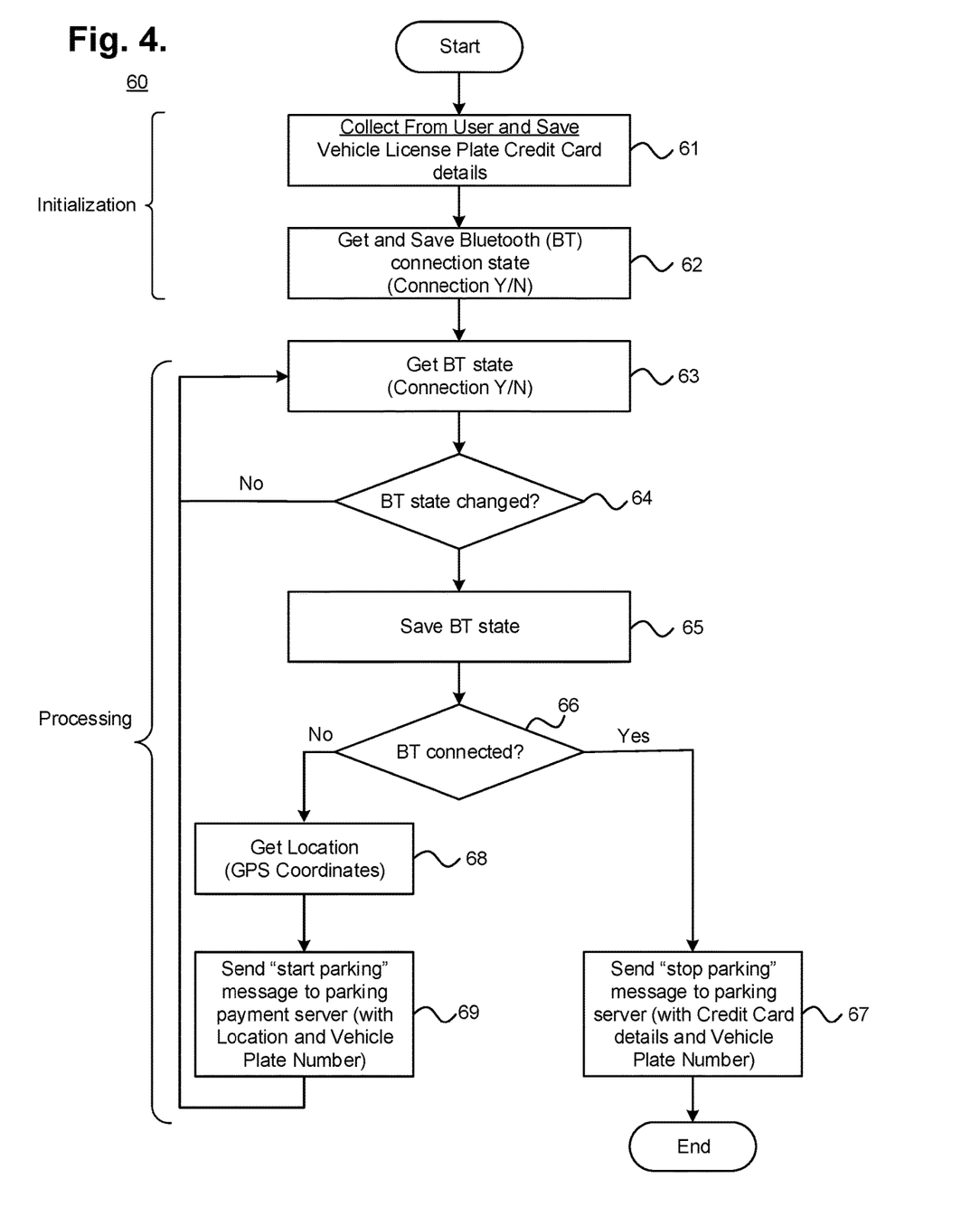
FIG. 4 is a flow diagram showing, by way of example, a further method for proximity-based computer application control.

Management of another application, such as a parking application, can occur in two phases, an initialization phase and a processing phase, using a communication connection status between the device and the vehicle. FIG. 4 is a flow diagram showing, by way of example, a further method 50 for proximity-based computer application control. During an initialization phase, user data is collected and stored (block 51). The data collected can include a license plate of the user's vehicle and payment information, as well as other types of information. Also, during the initialization stage, a data communication connection state, such as a Bluetooth connection state, between a mobile device and a vehicle is obtained and saved (block 52). Other data communication connections states between a mobile device and vehicle are possible. The different connection states can include connected and not connected.

Next, during a processing stage, a further Bluetooth connection state of the mobile device is obtained (block 53) at a later time. The Bluetooth connection status obtained during the processing stage is compared with the Bluetooth connection state obtained during the initialization phase to determine whether the Bluetooth connection status from the initialization stage changed (block 54). If the connection state has not changed, further readings of the connection state are obtained. However, if the connection state has changed, the Bluetooth connection state obtained from the processing stage is saved (block 55). The connection state is identified (block 56) as either a Bluetooth connection or no Bluetooth connection. If there is no Bluetooth connection, a location of the device is obtained (block 58), such as via GPS coordinates, and the management application sends (block 59) a "start parking" message to a parking payment server along with the stored license plate data and location of the vehicle. After parking has been initiated by the user, monitoring for a Bluetooth connection continues until a connection has been identified, which can indicate that the user has returned to the car.

When a Bluetooth connection is identified, the management application sends (block 57) a "stop parking" message to the parking payment server with payment information and the user's vehicle license plate. Once the message is received, the parking session is terminated and the user's payment information is processed.

Figure 5:
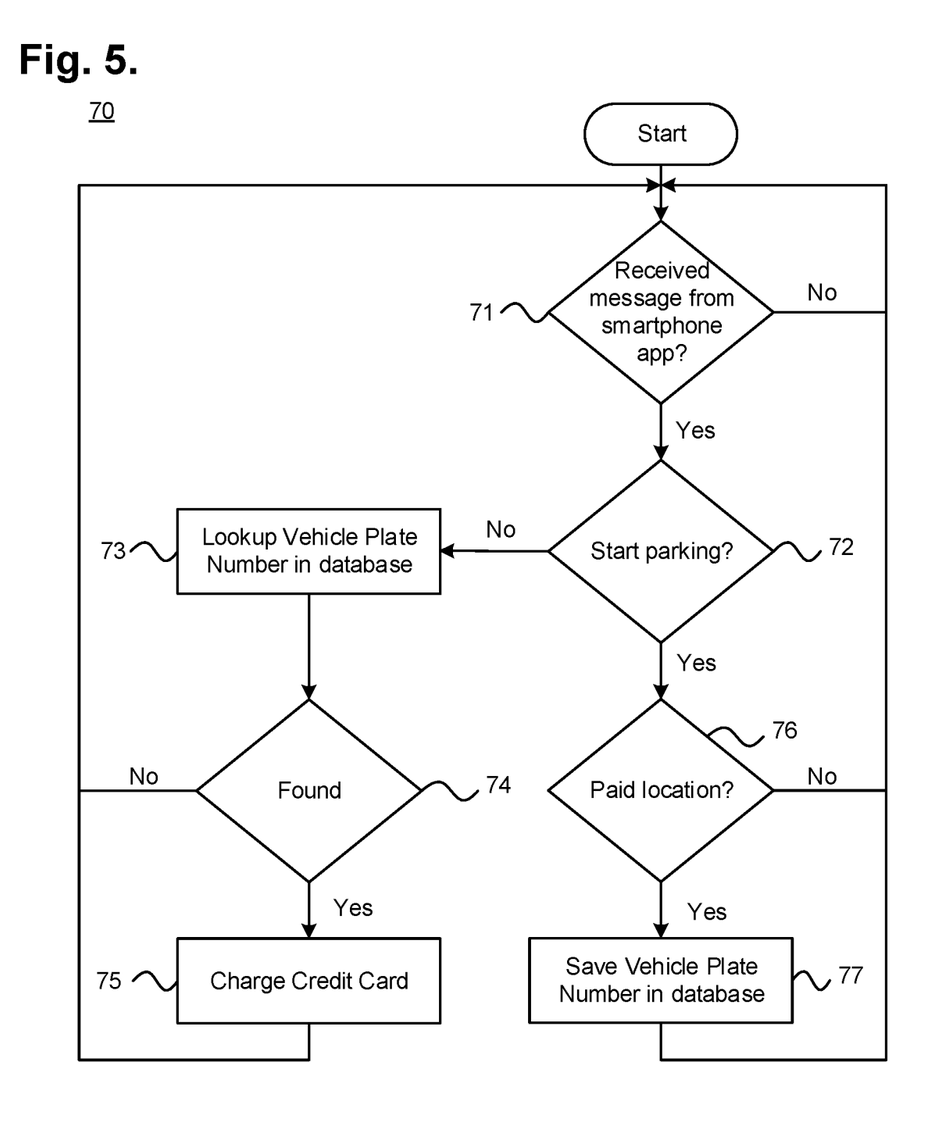
FIG. 5 is a flow diagram showing, by way of example, a method performed by a server during the proximity-based computer application control.

The management application communicates with a management or payment server to control another application, such as the parking application. FIG. 5 is a flow diagram showing, by way of example, a method 70 performed by a server during the proximity-based computer application control. A server associated with the management application determines (block 71) whether a message was received from the management application. If parking is to begin (block 72), a further determination is made as to whether payment is required (block 76). If not, no further information or monitoring is required. However, if payment is required, information about the driver or vehicle, such as the vehicle license plate, is saved (block 77) and the server waits until a further message regarding terminating parking is received (block 72).

Alternatively, if parking is not beginning, but has already commenced, the license plate of the vehicle for which the message was sent, is looked up (block 73) in a database. If the license plate number is found (block 74), payment information associated with the vehicle is processed (block 75). However, if the vehicle is not identified, such as via the license plate, the server waits until a further message regarding the vehicle is received.

In a further embodiment, the management application can be installed in memory installed in the vehicle during manufacture or after market. Thus, when the driver parks, the management application records a location of the parking space and provides a reminder to the driver to initiate a parking session, if the driver has not already done so. Subsequently, the management application can monitor a location of the vehicle and a presence of the driver within the vehicle, such as by determining a location of the driver's mobile device. If the driver is located in the vehicle and the vehicle is in the same location, the driver can be identified as returning to the vehicle. Subsequently, the management application determines whether a location of the vehicle has changed and if so, a determination can be made that the driver forgot to terminate the parking session. Thus, the management application contacts the parking application to terminate parking. The vehicle can be determined to have left the parking space after the vehicle has traveled a predetermined distance from the parking space or a predetermined amount of time has passed since the vehicle left the parking space.

Further still, when the management application is installed in the vehicle memory, a mobile device may be unnecessary. For instance, when a user drives a vehicle to a parking space. During the drive, vehicle movement is detected, but when the vehicle is parked, no movement is detected. Subsequently, upon return to the parked vehicle, movement of the vehicle, from the parked state, can trigger the management application to send a "terminate parking" message to the parking application or server for terminating the parking session and processing payment. The movement of the vehicle can be determined, for example, via an accelerometer associated with the vehicle; however, other methods of movement detection are possible.

Additionally, the termination of a parking session can also be identified based on vehicle movement and vehicle location via GPS located within the vehicle. For example, when the user is driving the vehicle, movement is detected. Once the user finds and parks in an available parking space, a no movement state and a location of the vehicle are detected. A determination is made that the user has parked and an "initiate parking" message is sent to the user or the parking server to initiate parking. When the user returns to the car and begins driving away from the parking space, movement of the vehicle is detected and a location of the vehicle can also be detected. A "terminate parking" message is transmitted to at least one of the parking application and server for terminating the parking session when the vehicle is further than a threshold distance from the parking space as determined via the detected vehicle location.

In yet a further embodiment, the management application can work with driverless vehicles. For instance, a driverless vehicle parks in a parking space, which is identified by the management application. Information regarding the space is obtained via a mobile device or the vehicle itself, and provided to a parking application to initiate a parking session, including providing payment information. The management application can select one or more accounts within the parking application when multiple accounts exist. For example, an owner of the vehicle or an individual controlling the vehicle can be responsible for payment. Alternatively, the vehicle can be associated with an account within the parking application and one or more parties can be responsible for the payment. Once, the parking session is initiated, the management application monitors whether the vehicle leaves the parking space and if so, the management application terminates the parking session via the parking application. The vehicle can be determined to have left the parking space after the vehicle has traveled a predetermined distance from the parking space or a predetermined amount of time has passed since the vehicle left the parking space.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for proximity-based computer application control, comprising:
    a database to store data associated with a user with a vehicle;
    a server comprising a central processing unit, memory, an input port to receive the data associated with the user, and an output port, wherein the central processing unit is configured to:
        monitor a parking session of the vehicle via a management software application, wherein the parking session is initiated via a different parking software application;
        obtain an initial communication connection status between a device associated with the user and the vehicle via the management software application;
        obtain at a later time a further communication connection status via the management software application;
        compare the further communication connection status with the initial communication connection status via the management software application;
        determine via the management software application that a status of the further communication connection status differs from the initial communication status and the status of the further connection status is connected; and
        transmit from the management software application downloaded on the device of the user a session termination message to the parking software application downloaded on the device of the user when the statuses differ.

2. A computer-implemented system according to claim 1, wherein the central processing unit identifies a location of a parking space in which the vehicle is parked during the parking session, obtains a location of the device when the further communication connection status is connected, assigns the location of the device to the vehicle, compares the assigned location of the vehicle with the location of the parking space, and determines that the vehicle left the parking space when the assigned location of the vehicle is different than the location of the parking space.

3. A computer-implemented system according to claim 2, wherein the determination that the vehicle left the parking space is made when the assigned location of the vehicle differs by a predetermined distance from the location of the parking space.

4. A computer-implemented system according to claim 1, wherein the central processing unit transmits from the first application a session initiation message to the second application when the further communication connection status differs from the initial communication connection status and is not connected.

5. A computer-implemented system according to claim 4, wherein the initial communication connection status is connected.

6. A computer-implemented system according to claim 1, wherein the central processing unit transmits from the first application a session initiation message to the user when the further communication connection status differs from the initial communication connections status and is not connected.

7. A computer-implemented system according to claim 1, wherein the parking session is entered into a queue of pending parking sessions monitored by the second application.

8. A computer-implemented system according to claim 7, wherein the parking session is removed from the queue via the second application upon receipt of the session termination message.

9. A computer-implemented system according to claim 1, wherein the initial communication connection status and the further communication connection status are determined via Bluetooth.

10. A computer-implemented system according to claim 1, wherein the initial communication connection status is not connected.

11. A computer-implemented method for proximity-based computer application control, comprising:
    monitoring a parking session of a vehicle via a management software application, which is initiated via a different parking software application;
    obtaining an initial communication connection status between the vehicle and a device associated with a user of the vehicle;
    obtaining at a later time a further communication connection status via the management software application;
    comparing the further communication connection status with the initial communication connection status via the management software application;
    determining via the management software application that a status of the further communication connection status differs from the initial communication connection status and that the status of the further connection status is connected; and
    transmitting from the management software application that is downloaded on the device of the user a session termination message to the parking software application downloaded on the device of the user when the statuses differ.

12. A computer-implemented method according to claim 11, further comprising:
    identifying a location of a parking space in which the vehicle is parked during the parking session;
    obtaining a location of the device when the further communication connection status is connected;
    assigning the location of the device to the vehicle;
    comparing the assigned location of the vehicle with the location of the parking space; and determining that the vehicle left the parking space when the assigned location of the vehicle is different than the location of the parking space.

13. A computer-implemented method according to claim 12, wherein the determination that the vehicle left the parking space is made when the assigned location of the vehicle differs by a predetermined distance from the location of the parking space.

14. A computer-implemented method according to claim 11, further comprising:
transmitting from the first application a session initiation message to the second application when the further communication connection status differs from the initial communication connection status and is not connected.

15. A computer-implemented method according to claim 14, wherein the initial communication connection status is connected.

16. A computer-implemented method according to claim 11, further comprising:
transmitting from the first application a session initiation message to the user when the further communication connection status differs from the initial communication connection status and is not connected.

17. A computer-implemented method according to claim 11, wherein the parking session is entered into a queue of pending parking sessions monitored by the second application.

18. A computer-implemented method according to claim 17, wherein the parking session is removed from the queue via the second application upon receipt of the session termination message.

19. A computer-implemented method according to claim 11, wherein the initial communication connection status and the further communication connection are determined via Bluetooth.

20. A computer-implemented method according to claim 11, wherein the initial communication connection status is not connected.

* * * * *